United States Patent [19]

Chambers

[11] Patent Number: 4,586,702
[45] Date of Patent: May 6, 1986

[54] SYSTEM FOR ORIENTING ONE BODY RELATIVE TO A SECOND BODY IN THREE ORTHOGONAL DIRECTIONS

[75] Inventor: Robert W. Chambers, Willingboro, N.J.

[73] Assignee: RCA Corporation, Princeton, N.J.

[21] Appl. No.: 762,633

[22] Filed: Aug. 5, 1985

[51] Int. Cl.⁴ .............................................. B23Q 1/06
[52] U.S. Cl. .................................... 269/310; 198/345
[58] Field of Search ................................ 269/309–310, 269/56, 296; 33/180 R; 198/345; 29/559, 563, 464, 33 P

[56] References Cited

U.S. PATENT DOCUMENTS

| | | |
|---|---|---|
| 227,252 | 5/1880 | Hodges . |
| 2,249,230 | 7/1941 | Schafer . |
| 2,819,784 | 1/1958 | Brown, Jr. . |
| 3,175,820 | 3/1965 | Schiler . |
| 3,491,977 | 1/1970 | Iller . |
| 3,540,318 | 11/1970 | Greenberg . |
| 3,606,300 | 9/1971 | Davis . |
| 3,826,047 | 7/1974 | Binder . |
| 4,185,812 | 1/1980 | Hall . |
| 4,239,445 | 12/1980 | Ozawa . |
| 4,331,229 | 5/1982 | Kamm . |
| 4,390,172 | 6/1983 | Gotman .............................. 269/56 |
| 4,393,999 | 7/1983 | Forshee ............................. 248/346 |
| 4,429,862 | 2/1984 | Niedecker ......................... 269/309 |

Primary Examiner—Robert C. Watson
Attorney, Agent, or Firm—Joseph S. Tripoli; George E. Haas; William Squire

[57] ABSTRACT

A television receiver is located on a pallet assembly via molded-in-place locating elements in the receiver base. Two elements have corresponding openings which mate with respective resilient structures on the pallet assembly to locate the receiver in two orthogonal horizontal directions about a vertical axis. A set of the elements on the receiver base abut a set of corresponding elements on the pallet assembly for positioning a plurality of spaced points on the receiver cabinet in the vertical direction in a reference horizontal plane.

13 Claims, 14 Drawing Figures

SYSTEM FOR ORIENTING ONE BODY RELATIVE TO A SECOND BODY IN THREE ORTHOGONAL DIRECTIONS

This invention relates to a system for orienting a workpiece or other body to a support in three orthogonal directions.

In the manufacture of components and assemblies it is often a requirement that workpieces be positioned at predetermined orientations at work stations for operation by robotic systems. Often workpieces are of simple geometric configuration and have well-defined reference surfaces which permit them to be located accurately. For example, printed circuit boards are generally planar sheet material and have well-defined locating apertures and surfaces which relate accurately to elements to be located on the printed circuit board. A problem occurs, however, when workpieces are made of materials which tend to cause the locating dimensions to differ among the workpieces in an undesirable range.

One such kind of material includes molded thermoplastics which, due to shrinkage and other factors, tend to cause relatively significant dimensional variation from workpiece to workpiece. This becomes a problem in thermoplastic molded television receiver cabinets whose alignment within the desired tolerance range is critical due to the location of a large number of components, adjustments and the many different component orientations.

In U.S. Pat. No. 4,390,172 a quick release positioning mechanism is disclosed employing dihedral and trihedral openings for locating mating hemispheres to desired locating points. However, the present inventor recognizes that that system has a drawback in locating a large molded thermoplastic workpiece such as a television receiver assembly. The dihedral and trihedral openings described in that patent, when molded of thermoplastic material, tend to have a relatively large dimensional tolerance range such that a small change in transverse spacing of the dihedral and trihedral side walls can result in a relatively large variation in the depth direction (24' FIG. 13). Such a variation in the depth direction is intolerable in a robotic system.

A locating system according to the present invention comprises a body having first and second spaced aligned locating openings therein for defining a first body reference plane. The body further includes at least three spaced first reference surfaces for locating a second body reference plane orthogonal to the first body reference plane. A body locating means comprises a support including first and second projections adapted to respectively resiliently engage the openings to respectively position the first body reference plane relative to a first support reference plane. The support includes at least three reference second surfaces spaced to respectively abut the first reference surfaces when the projections are engaged with the openings so as to position the body second plane relative to a second support reference plane normal to the first support plane.

Figure 1:
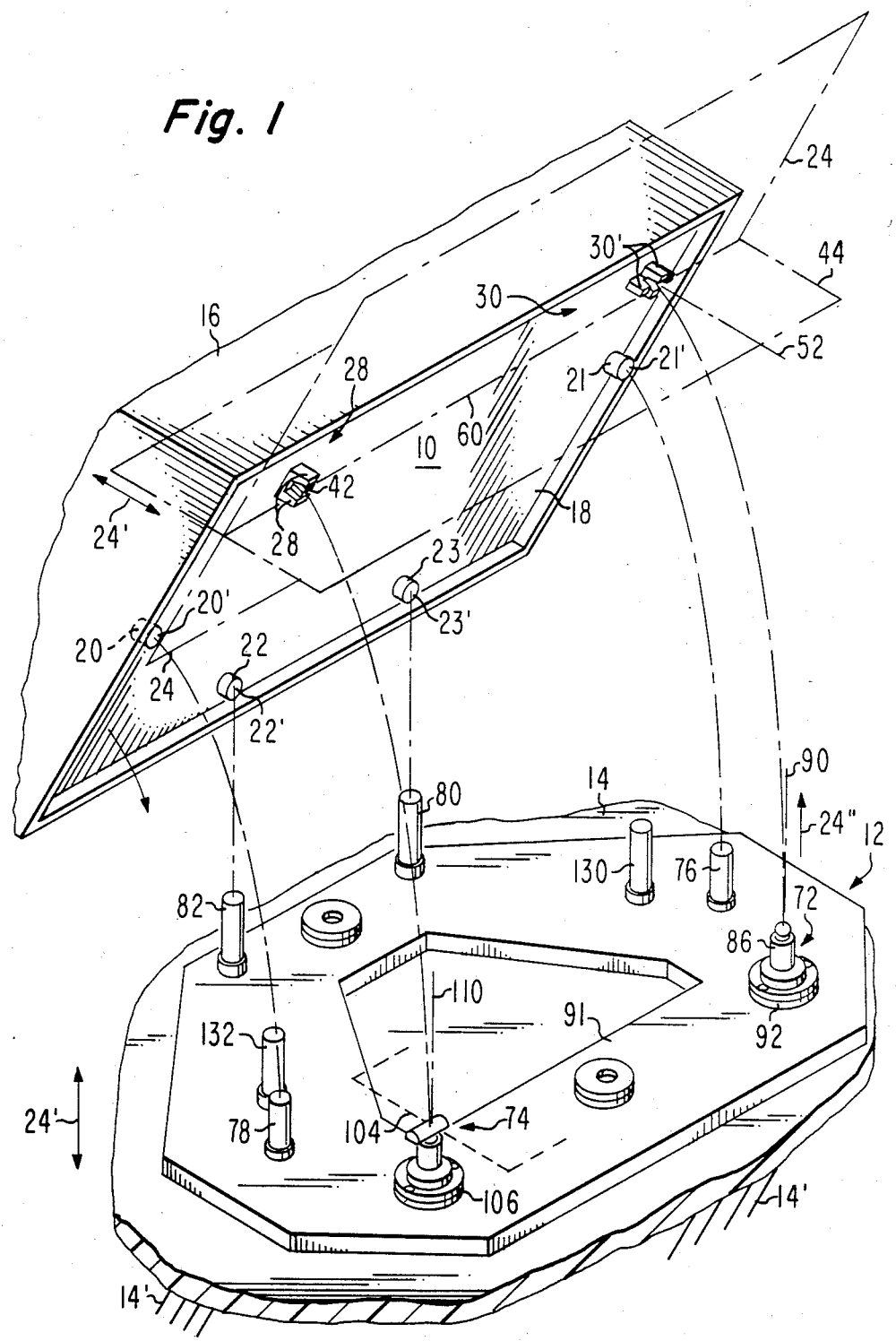
FIG. 1 is an isometric exploded view of an orienting system according to one embodiment of the present invention.
Figure 2:
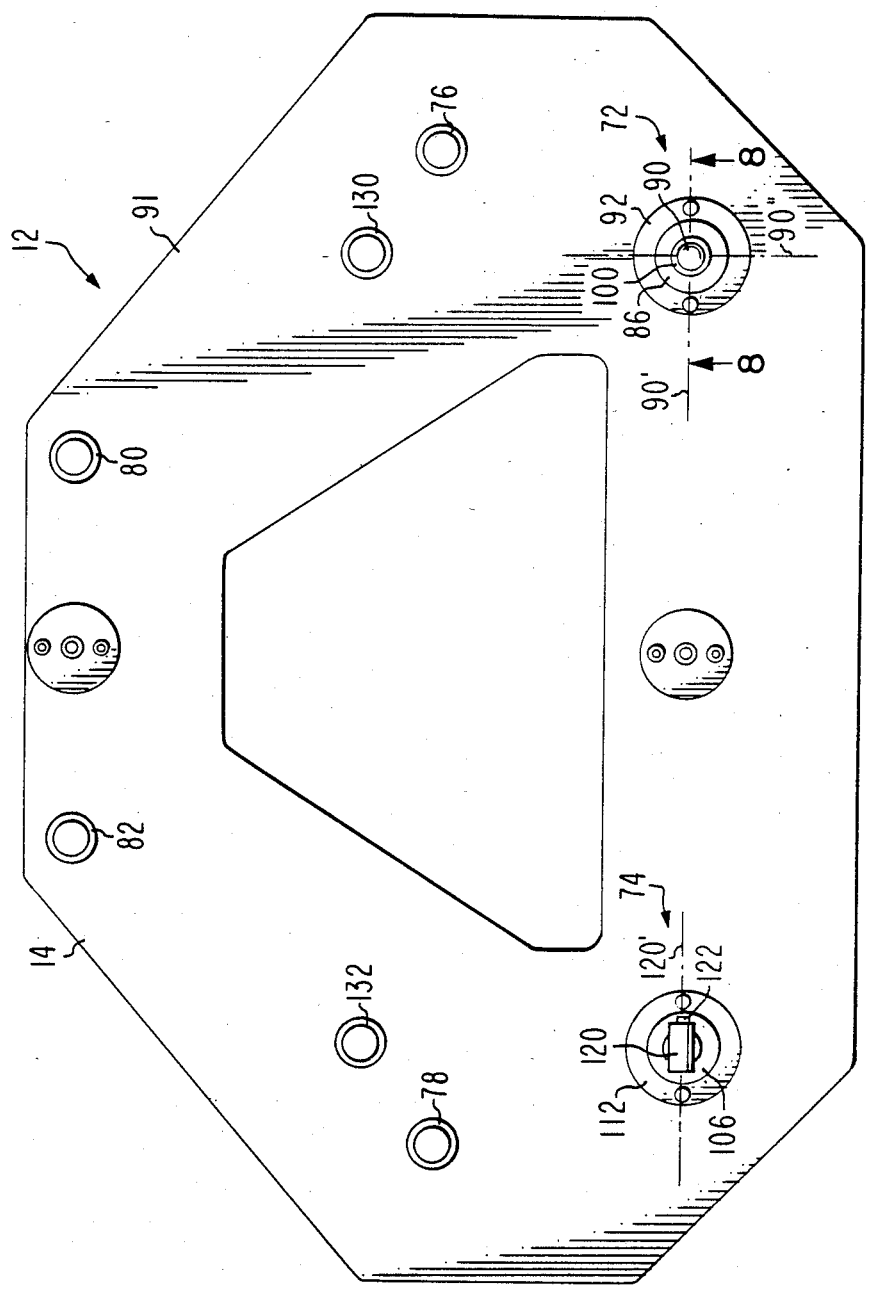
FIG. 2 is a plan view of a support locating body.

In FIG. 1, a television receiver 10 is shown tilted from its normal horizontal orientation for simplicity of illustration. The receiver 10 is required to be releasably secured to pallet assembly 12 which, in turn, is secured to support plate 14 of a manufacturing assembly transfer system represented by the symbols 14'. The receiver is aligned to and held in place on assembly 12 by its weight. It is assumed in the system of FIG. 1 that the transfer system 14' accurately locates the pallet assembly 12 to a predetermined reference location in which every point on the pallet assembly 12 is within the desired location in three orthogonal directions within a given manufacturing tolerance. By way of example, one such system for transferring and locating a pallet assembly to a work station is disclosed in copending application Ser. No. 762,634, filed concurrently herewith by the present inventor, and entitled SYSTEM FOR TRANSFERRING AND LOCATING A BODY RELATIVE TO A SUPPORT. The pallet assembly 12 is required to receive and locate the receiver 10 at a work station reference location as determined by the transfer system, symbols 14.

Receiver 10 includes an internal electronic chassis (not shown) secured within a thermoplastic molded cabinet 16. Cabinet 16 base 18 has integral molded rigid locating projections 20, 21, 22, 23, 28, and 30 in a given spaced relationship. Projections 20-23, 28, and 30 have reference end surfaces 20', 21', 22' 23', 28', and 30', respectively, which are at a fixed reference location in vertical directions 24' relative to the remaining cabinet 16 structures. Such structures include the back cover assembly 17, FIG. 3, the picture tube and chassis (not shown), and various controls and appurtenances to be operated on or assembled by an automatic robotic system (not shown). These reference end surfaces define the orientation and location of a horizontal reference plane 24 relative to cabinet 16 for locating the cabinet at a reference location in directions 24'. The end surfaces may, in practice, lie in different planes, but because they are relatively rigid, they fix the orientation of the cabinet 16 and thus the internal components in the vertical directions 24'. For purposes of illustration, the end surfaces 28' and 30' of respective projections 28 and 30 are shown defining the location of a reference plane 24. The orientation of plane 24 about axis 60 defined by surfaces 28' and 30' is fixed by surfaces 20'-23'. The horizontal and vertical orientations of the different planes and axes refer to their orientation when cabinet 16 is secured to assembly 12 with plane 24 horizontal.

Figure 9:
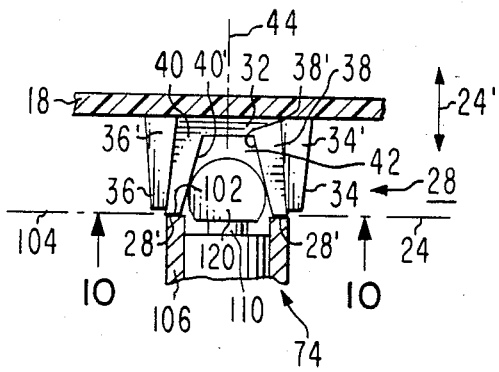
FIG. 9 is an elevation sectional view illustrating the engagement of one locating structure with an opening in the base of the receiver cabinet of FIG. 3.
Figure 10:
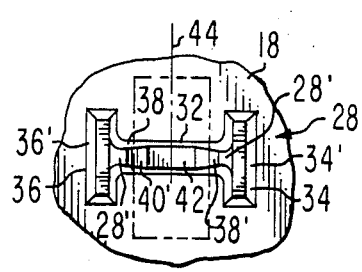
FIG. 10 is a plan view of the embodiment of FIG. 9 taken along lines 10—10.

In FIGS. 9 and 10, projection 28 comprises a U-shaped element including a base wall 32 and two spaced upright legs 34 and 36 which extend from base 18. Leg 34 includes a reinforcing rib 34' and a wall 38 secured to rib 34'. Leg 36 comprises a rib 36' to which is secured wall 40. Wall 38 has a locating side surface 38' which faces locating side surface 40' of wall 40. Surfaces 38' and 40' diverge as they extend away from the base 18 to define a truncated dihedral space 42. Surfaces 38' and 40' define vertical plane 44 which bisects space 42 normal to plane 24.

Figure 11:
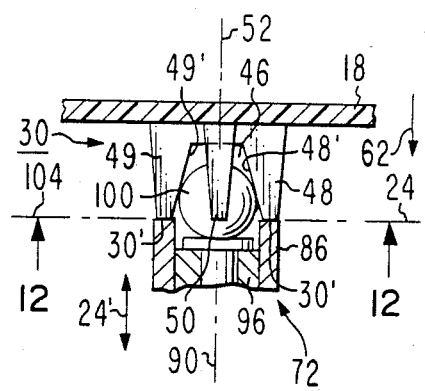
FIG. 11 is a view to that of FIG. 9 illustrating a second locating structure engaged with a second locating opening in the base of the receiver cabinet of the embodiment of FIG. 3.
Figure 12:
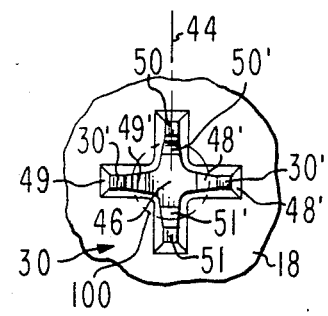
FIG. 12 is a plan view of the embodiment of FIG. 11 taken along lines 12—12.

In FIGS. 11 and 12, projection 30 comprises two U-shaped structures each similar to projection 28, FIGS. 9 and 10, whose dihedral spaces are disposed at right angles to each other, thus forming a truncated tetrahedron space 46. Walls 48 and 49 form a first dihedral space whose centroid locates plane 44, FIG. 12, and walls 50 and 51 form the second dihedral space. The respective facing wall surfaces 48', 49', 50', and 51' extend from base 18 diverging relative to axis 52 to form space 46. The tetrahedron space 46 longitudinal axis 52 is normal to plane 24 and is in plane 44. The long axes of projections 20, 21, 22, and 23, FIG. 1, are parallel to plane 44 and axis 52. The relationship of planes 24 and 44 and axis 52 are more clearly illustrated in FIG. 14. The planes 24 and 44 and axis 52 locate cabinet 16, in three orthogonal directions 24', 44', and 52', respectively. This orients the entire cabinet relative to a locating cabinet reference point 52". Plane 44 locates the angular position of the cabinet relative to axis 52 and plane 24 locates the angular position of the cabinet about axis 60.

Figure 13:
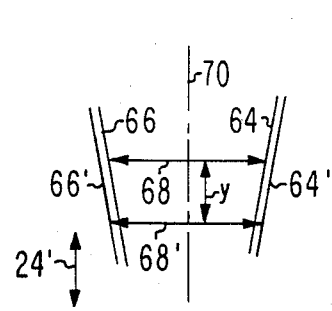
FIGS. 13 and 14 are diagrams useful in explaining the principles of the present invention.
Figure 14:
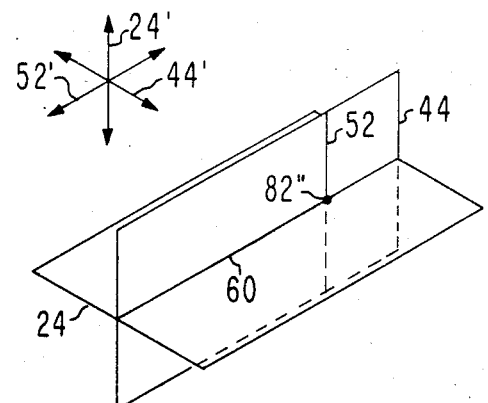

The dihedral space 42 and tetrahedral space 46, FIGS. 9 and 11, respectively, define the location of plane 44 and axis 52 in two horizontal orthogonal directions 44' and 52', FIG. 14, but, however, do not accurately provide a reference location in vertical directions 24'. The reason for this is shown in FIG. 13. In FIG. 13, lines 64 and 66 represents the inner surfaces 38' and 40' of the dihedral space 42 projection 28, FIG. 9. When a projection, such as projection 28, is molded of thermoplastic material, the molding process is such that due to shrinkage and possible other factors there may be a difference among different cabinets in the transverse dimension 68, FIG. 13, normal to the dihedral central axis 70, corresponding to axis 52, FIG. 14. A small change in the transverse spacing of the walls as represented by lines 64' and 66', axially displaces transverse dimension 68 a vertical distance y to the position of transverse dimension 68', FIG. 13. Thus, a small change in transverse dimensioning between the walls 64 and 68 forming the dihedral, tetrahedral or other polyhedral space results in a significant shift distance y in the axial position of a given transverse dimension defined by those walls. For example, a spherical element of that given transverse dimension 68 disposed in a polyhedral space and abutting the surfaces forming that space will accurately locate the center of the sphere in two orthogonal horizontal directions 44' and 52', FIG. 14, on axis 70, FIG. 13. However, that sphere will not be accurately positioned in vertical directions 24' parallel to axis 70 due to the error distance y.

In the particular embodiment disclosed herein employing a thermoplastic molded cabinet, the transverse dimension, corresponding to dimension 68, FIG. 13, can differ from cabinet to cabinet. For these reasons, the projections 28 and 30, FIG. 1, are formed with the end surfaces 28' and 30' which are fixed in directions 24' for defining the location of reference plane 24 in those directions. In the alternative to the projecting structures shown in FIGS. 9, 10, 11, and 12 the dihedral space 42 and tetrahedral space 46 may be defined by surfaces recessed into base 18.

In FIG. 1, pallet assembly 12 includes a pallet plate 91. Secured to plate 91 is locating assembly 72 which mates with projection 30, a second locating assembly 74 which mates with projection 28, and four rigid stanchions 76, 78, 80, and 82.

Figure 3:
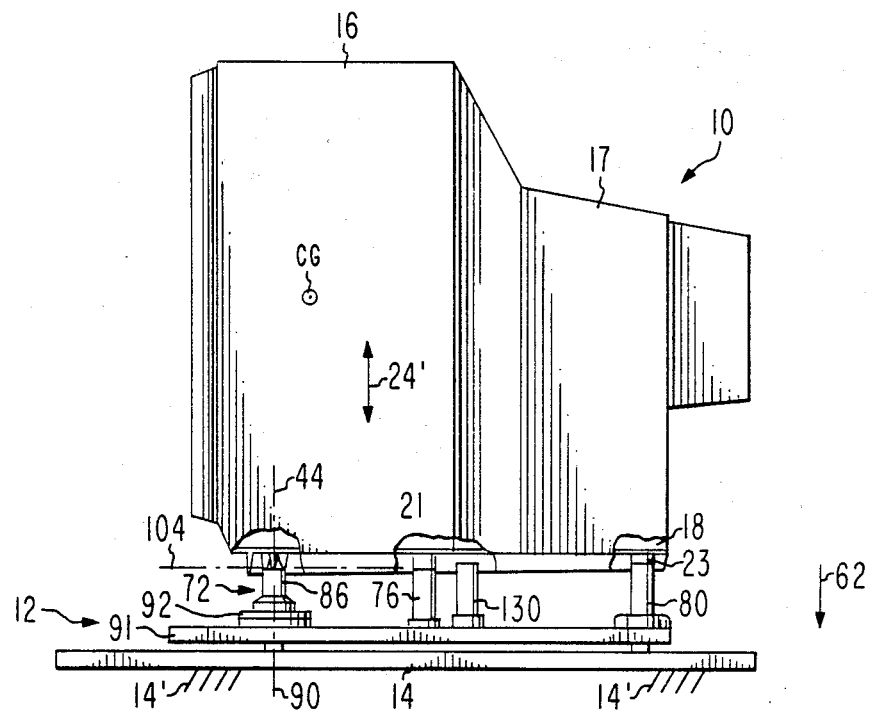
FIG. 3 is a side elevation view of the system of FIG. 1 comprising a television receiver as secured on the support body.
Figure 4:
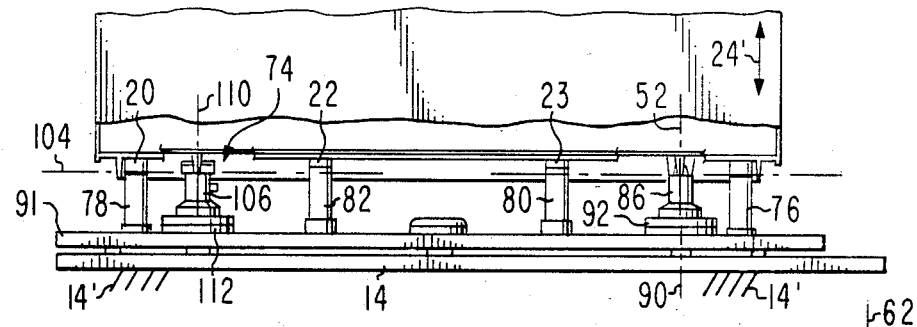
FIG. 4 is a front elevation view of the system of FIG. 3.

In FIGS. 3 and 4, the projections 20–23 on the cabinet base 18 locate the cabinet in the vertical directions 24' via respective mating pallet stanchions 76, 78, 80, and 82. The end surfaces of the stanchions 76, 78, 80, and 82 may lie in different planes. The stanchions' extended end surfaces are spaced to abut and locate the received respective end surfaces of corresponding cabinet projections 21, 20, 23, and 22 in a given reference position in directions 24' and define the location of plane 24 relative to plate 91. Stanchions 76, 78, 80, and 82 are used to locate spaced points on a relatively flexible cabinet structure. Due to the cabinet assembly weight, the different projections of the cabinet are forced by gravity into contact with the stanchions of pallet assembly 12, bending the cabinet, if necessary, thereby placing all points of the cabinet at their desired undistorted design location.

Locating assemblies 72 and 74 include fixed, rigid elements having surfaces, which define a fixed reference position in vertical directions 24' for locating end surfaces 30' and 28' of respective projections 30 and 28. Stanchions 76, 78, 80, 82 and assemblies 72 and 74, FIG. 1, thus define the location of a reference plane for locating cabinet plane 24 in the vertical directions. Assemblies 72 and 74 also include resilient elements which define a vertical plane corresponding to plane 44, FIG. 1, and a reference point corresponding to point 52" to thereby locate cabinet 16 to pallet plate 91 in the two orthogonal horizontal directions. The cabinet is thus located in three orthogonal directions. These functions will become clearer in view of the detailed description that follows.

Figure 8:
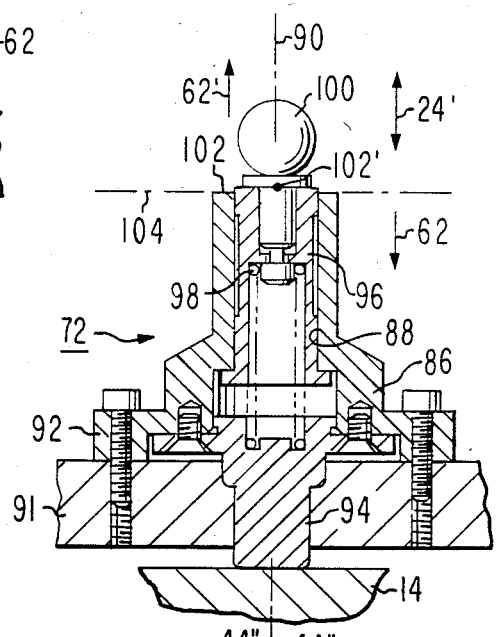
FIG. 8 is a sectional view of a second locating structure similar to the view of FIG. 7.

In FIG. 8, locating assembly 72 comprises a support 86 having a circular cylindrical bore 88 which has a longitudinal axis 90. Support 86 is secured to plate 91 by flange 92. A locating element 94 is secured to support 86 for locating assembly 72 to support plate 14, in directions 24'. Plunger 96 is closely fitted to bore 88 for movement in directions 24' with negligible displacement in the transverse directions. Compression spring 98 in bore 88 abuts element 94 for resiliently urging plunger 96 in direction 62' away from plate 91. Secured to the extended end of plunger 96 is a sphere 100 whose centroid lies on bore axis 90. Sphere 100 thus is displaceable in directions 24' relative to support 86 and is normally urged away from plate 91, FIG. 1. Support 86 at its upper extended end comprises a tube having an end surface 102 which lies in reference plane 104 for locating cabinet projection end surface 30' at plane 104.

In FIG. 11, when cabinet projection 30 is placed in contact with sphere 100, the sphere 100 engages the projection 30 tetrahedron wall surfaces 48′–51′, FIG. 12, and this accurately locates the sphere centroid and axis 90 on the projection 30 axis 52. The tetrahedron is employed because its walls are oriented in orthogonal directions which is important for locating axis 52 in directions 44′ and 52′, FIG. 14. In response to the weight of the television receiver on resilient plunger 96, FIG. 11, the cabinet drops by its weight and depresses the plunger, direction 62, into the bore 88 of support 86 aligned on axis 90, FIG. 8. The plunger continues to depress until the projection end surfaces 30′ lying on plane 24 abut the end surface 102 of support 86 at plane 104, FIG. 11. This accurately locates the projection 30 reference point 52″, FIG. 14, to the assembly 72 corresponding reference point 102′, FIG. 8, at the intersection of axis 90 with plane 104, FIG. 9, at end surface 102.

Figure 5:
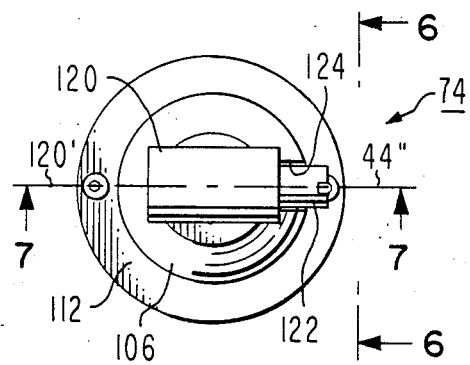
FIG. 5 is a plan view of one of the locating structures of the embodiment of FIG. 1.
Figure 6:
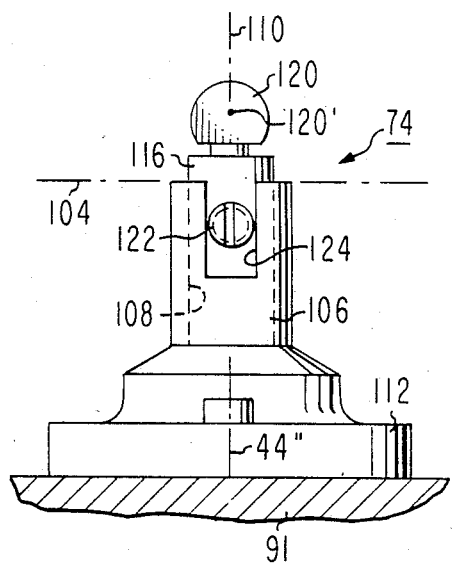
FIG. 6 is a side elevation view of the structure of FIG. 5 taken along lines 6—6.
Figure 7:
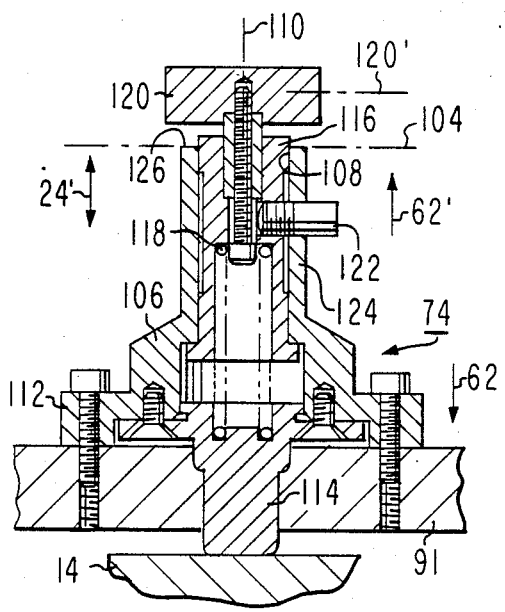
FIG. 7 is a sectional elevation view of the structure of FIG. 5 taken along lines 7-7.

In FIGS. 5, 6, and 7, locating assembly 74 comprises a support 106 having a circular cylindrical bore 108 which has a longitudinal axis 110. Support 106 is secured to plate 91 via flange 112. Secured to support 106 is a locating element 114 which abuts and locates plate 91 in directions 24′ relative to the support plate 14. Plunger 116 is located within bore 108 for movement in directions 24′. A compression spring 118 abuts element 114 and plunger 116 in bore 108 for resiliently urging plunger 116 aligned on axis 110 in direction 62′ away from plate 91. Attached to the extended end of plunger 116 is a horizontal semicircular locating cylinder 120. The longitudinal axis 120′ of cylinder 120 intersects and is normal to bore axis 110. Secured to plunger 116 is a guide pin 122. Pin 122 is guided by slot 124 in a wall of support 106, the slot being parallel to axis 110. Pin 122 closely engages the walls of slot 124 to insure that the longitudinal axis 120′ of cylinder 120 and axis 110 define a fixed plane 44″, FIG. 5, for locating plane 44, FIG. 1, of projection 28 coincident therewith. Support 106 at its extended end is a rigid circular tube having an end surface 126, FIG. 7. End surface 126 lies in and, with end surface 102 of support 86, FIG. 8, fixes the relative location of plane 104.

In FIG. 9, when cylinder 120 abuts the dihedral surfaces of projection 28 the cylinder's circular cylindrical surface automatically locates its reference plane 44‴, FIG. 5, coincident with the projection 28 reference plane 44. The cabinet weight is sufficient to depress cylinder 120 until the end surface 28′ of projection 28 abuts the end surface 102 of support 106, locating cabinet plane 24 and axis 60, FIG. 1, on plane 104. The cabinet 16 reference point 52″, FIG. 14, is thus located coincident with corresponding reference point 102′ of assembly 72, FIG. 8.

The center of gravity (CG) of the receiver 10. FIG. 3, is thus located in orthogonal directions 24′, 44′, and 52′, FIG. 14. The CG is in the region bounded by stanchions 76 and 78, FIG. 1, and assemblies 72 and 74. Therefore, the majority of the weight of the receiver 10 is supported by assemblies 72 and 74, and stanchions 76 and 78, FIG. 1. However, the cabinet base 18 region between projections 20, 21 and 22, 23, FIG. 1, is flexible relative to the region between projections 20, 21 and 28, 30 and bears some load transmitted by the chassis (not shown). The projections 20–23, 28, and 30 on the cabinet and assemblies 72 and 74 and stanchions 76, 78, 80, 82 bear the weight of the receiver 10 and locate all points of the cabinet to a reference location in directions 24 in view of the flexibility of the base 18.

In FIG. 1, additional rigid stanchions 130 and 132 may be provided on plate 91 for locating receiver cabinets of different dimensions than the one illustrated to make the pallet assembly 12 universal for different size receiver cabinets. In the present case, the stanchions 130 and 132 are not in use for locating cabinet 16. When in use, the stanchions 130 and 132 would be used in place of the stanchions 80 and 82, by way of example.

What is claimed is:

1. A body locating system comprising:
a body having first and second spaced aligned locating openings therein for defining a first body reference plane and at least three spaced first reference surfaces for locating a second body reference plane orthogonal to the first body reference plane; and
body locating means comprising a support including first and second projections adapted to respectively resiliently engage said openings to position the first body reference plane relative to a first support reference plane, and at least three fixed second reference surfaces spaced to respectively abut said first reference surfaces when said projections are engaged with said openings so as to position said second body plane relative to a second support reference plane normal to the first support plane.

2. The system of claim 1 wherein said reference surfaces each comprise a planar end surface of a fixed element extending from one of said support and said body.

3. The system of claim 1 wherein said body is made of thermoplastic material, said body forming said first opening into a dihedral space and said second opening into a tetrahedral space, each opening converging about respective parallel axes toward said body.

4. The system of claim 1 wherein said first opening is being defined by a set of walls having side surfaces forming a dihedral space symmetrical to said first body reference plane, said second opening being defined by a set of walls having side surfaces forming a polyhedral space symmetrical to a first axis lying in said first body reference plane, at least one of said first reference surfaces being spaced from the openings, each said set of walls having fixed locating surfaces defining with said one reference surface said second body reference plane normal to said first axis, said first and second projections each comprising a symmetrical locating member adapted to resiliently displace in a direction parallel to said first axis to engage the side surfaces of the walls of said first and second openings, respectively, to thereby locate said projections on said first body plane and one of said projections on said first axis.

5. The system of claim 4 wherein said first locating member comprises a semicircular cylindrical element for engaging the walls of said first opening and the second locating member comprises a spherical segment for engaging the walls of said second opening.

6. The system of claim 5 wherein said element and segment are each secured to said second body for resilient displacement in a direction in a given plane defined by said element and segment.

7. The system of claim 5 wherein said first member further includes means for maintaining said cylindrical element oriented with its longitudinal axis in a given plate during said displacement.

8. The system of claim 1 wherein one opening in said body is formed by a pair of plane walls diverting symmetrically relative to said first body reference plane which lies between said walls and from said body at a first body location, the other opening is formed by a plurality of plane walls diverting symmetrically relative to a first axis and from said body at a second body location spaced from the first location, said axis lying in said first body reference plane; said first and second spaced reference surfaces located in said first body reference plane and said third reference surface being spaced from that plane; said first projection including a first plunger having a semicircular reference portion adapted to resiliently engage and be located by said pair of walls on said plane in a direction parallel to said axis and the second projection including a second plunger spaced from the first plunger and having a hemispherical reference portion adapted to resiliently engage and be located by said plurality of walls on said axis.

9. In a system for locating a body having first and second spaced aligned locating openings therein for defining a first body reference plane and at least three spaced first reference surfaces for locating a second body reference plane orthogonal to the first body reference plane, a body locating device comprising:
a support;
first and second projections secured to the support and adapted to respectively resiliently engage said openings to respectively position the first body reference plane relative to a first support reference plane
at least three fixed second reference surfaces spaced to respectively abut said first reference surfaces when said projections are engaged with said openings so as to position said second body plane relative to a second support reference plane normal to the first support plane.

10. A body designed to be used with a body locating system including a support; first and second projections resiliently secured to the support for displacement in a given direction, the projections being adapted to define a first reference plane parallel to said given direction; and at least three first fixed spaced reference surfaces for defining a second reference plane normal to said first reference plane and said given direction, said body comprising:
a member having said first and second openings, said openings being shaped to define a first body reference plane, said first body plane corresponding to and aligned with said first reference plane when the openings are engaged with said projections; and
at least three spaced fixed second reference surfaces for defining a second body reference plane normal to the first body reference plane and corresponding to and aligned with the support secured reference plane when the projections are engaged with said openings.

11. The body of claim 10 wherein said member comprises a television receiver cabinet of molded thermoplastic material, said cabinet comprising a chassis receiving portion and a base portion, said openings being formed in said base portion.

12. The body of claim 11 wherein said base portion includes third and fourth spaced projections extending from the base portion, each said third and fourth projections defining a different one of said openings and a different one of two of said fixed second reference surfaces, said base portion including at least a fifth projection for forming at least the third of said fixed second reference surfaces.

13. A cabinet locating system comprising:
a cabinet base having a plurality of locating elements, two of the elements have corresponding openings for locating a first reference plane relative to the cabinet, said base including a first set of fixed elements for locating a second reference plane relative to the cabinet normal to the first reference plane; and
a pallet for locating the cabinet base relative thereto, the pallet including a set of resilient elements adapted to resiliently engage and locate the base first reference plane relative to a corresponding pallet first reference plane, the pallet further including a second set of fixed elements adapted to mate with and locate the first set of fixed elements relative to a pallet second reference plane normal to the pallet first reference plane to align the base relative to the pallet reference planes.

* * * * *

UNITED STATES PATENT AND TRADEMARK OFFICE
CERTIFICATE OF CORRECTION

PATENT NO. : 4,586,702

DATED : May 6, 1986

INVENTOR(S) : Robert W. Chambers

It is certified that error appears in the above-identified patent and that said Letters Patent is hereby corrected as shown below:

Column 2, line 19, after "view" insert --similar--.

Column 7, line 31, after "plane" insert --; and--.

Signed and Sealed this

Nineteenth Day of August 1986

[SEAL]

Attest:

DONALD J. QUIGG

Attesting Officer

Commissioner of Patents and Trademarks